June 26, 1962 C. E. G. BAILEY 3,041,516
ELECTROMECHANICAL SYSTEMS
Filed Nov. 4, 1957 3 Sheets-Sheet 1

INVENTOR
Christopher E. G. Bailey
BY
Ralph B. Stewart
ATTORNEY

June 26, 1962 C. E. G. BAILEY 3,041,516
ELECTROMECHANICAL SYSTEMS

Filed Nov. 4, 1957 3 Sheets-Sheet 3

INVENTOR
Christopher E. G. Bailey
BY
Ralph B. Stewart
ATTORNEY

United States Patent Office 3,041,516
Patented June 26, 1962

3,041,516
ELECTROMECHANICAL SYSTEMS
Christopher E. G. Bailey, London, England, assignor to The Solartron Electronic Group Limited, Thames Ditton, England, a British company
Filed Nov. 4, 1957, Ser. No. 694,430
Claims priority, application Great Britain Nov. 8, 1956
8 Claims. (Cl. 318—443)

The present invention relates to electromechanical control systems and particularly, but not exclusively, to electromechanical servo systems.

A conventional electromechanical servo system comprises a servo amplifier connected to drive an electric servo motor which in turn mechanically drives through a reduction gearing an electrical control device, such as a tachometer or potentiometer, the amplifier being fed with an error signal obtained by combining the input signal to the system and a feedback signal from the electrical control device.

Hitherto, in order to obtain good results efficient small motors operating at speeds of several thousand revolutions per minute have been employed in such systems. It is usual, however, that the output shaft be rotated at only a few revolutions per minute and a high-ratio gear train must then be employed. The power lost by friction in the early gears is relatively large and the initial torque required to overcome this sets a limit to the amplifier-motor combination. Furthermore, a sufficiently long bearing life is difficult to obtain.

When the system is an alternating current system, that is to say, a system utilising an A.C. amplifier, motor and control device, the output of the control device tends to develop phase shift with temperature and speed variation and special arrangements are needed to overcome such phase shift. On the other hand, if the system is a direct current system, the D.C. amplifier needs to be corrected against D.C. shift.

Furthermore, with convention motors, when the output of the amplifier is zero, there is little back-torque and the motor may thus tend to run backwards if driving a spring-torque load or if driving a friction-torque load in combination with a differential gear and a second motor.

It is an object of the present invention to provide an improved electromechanical control system which does not suffer from the aforesaid disadvantages.

A step-by-step motor has been proposed which includes a stator member and a rotor member, one of said members having three pairs of pole pieces located at points in equally spaced relationships on the circumference of a circle, each pair being diametrically opposite each other and adapted to be energised together into opposed states of magnetisation by the application of an energising voltage to energising windings thereon, and the other members having one pair of pole pieces energised or adapted to be energised together into opposed states of magnetisation and being so disposed that relative rotary movement of the two members brings the pole pieces of the said other member in turn adjacent each pair of diametrically opposite pole pieces of the said one member.

It can be shown that the said other member can have six stable positions by the application of six different patterns of energising potentials to the energising windings on the said one member. In each stable position said other member lies adjacent one of the pairs of pole pieces of said one member, the states of magnetisation of the said one of the pairs being such as to cause the said other member to be attracted thereto, the states of magnetisation of the pole pieces of the said one member at the next succeeding position being such as to attract the pole pieces of the said other member, and the states of magnetisation of the pole pieces of the said one member at the next preceding position being such as to repel the pole pieces of the said other member. Furthermore, by successively changing the predetermined patterns of potentials in a predetermined sequence the said other member can be stepped successively from one stable position to the next, each change being such as to change the states of magnetisation of the pair of pole pieces of the said one member at the said one position to states causing repulsion of the pole pieces of the said other member.

According to the present invention, there is provided an electromechanical control system comprising a step-by-step motor of the kind specified and an electrical circuit for sequentially applying six predetermined patterns of potentials in a predetermined sequence or in the opposite sequence to the energising windings of said motor to cause step-by-step rotation thereof in one sense or in the opposite sense, said circuit having six states in which it applies to said energising windings the six energising potential patterns respectively and through which it continuously and cyclically switches in one sense upon the application of a first control voltage and through which it continuously and cyclically switches in the opposite sense upon the application of a second control voltage, the circuit being stable in any one of said states in the absence of both said control voltages.

In a preferred embodiment of the invention, the arrangement of the windings on the pairs of pole pieces of the said one member is such that each pair of pole pieces can be brought to opposed states of magnetisation by the application of one of two energising potentials and the states of magnetisation thereof interchanged by the application of the other of the two energising potentials and said circuit comprises three switching units associated with the windings of the three pairs respectively of the pole pieces of the said one member of the motor, each switching unit having two stable states in one of which it applies said one of the two energising potentials to the energising windings of its associated pair of pole pieces and in the other of which it applies the other of the two energising potentials to the energising windings of said associated pair of pole pieces and control apparatus for cyclically switching the three switching units, the control apparatus being responsive to the first control voltage and to any two of the three units being in the same stable state to cause the preceding one of the two units to switch to its other stable state, being responsive to the second control voltage and to any two of the three units in the same stable state to cause the succeeding one of the two units to switch to its other stable state, and in the absence of said control voltages to allow the units to remain in the stable states to which they are switched.

In one embodiment of the invention each switching unit comprises a first set of changeover contacts of an electromagnetic relay, in one position of which one of the energising potentials is applied to the energising windings of the associated pair of pole pieces and in another position of which the other of the energising potentials is applied to the last-mentioned energising windings. The winding of each relay, hereinafter referred to as the first relay, the relays being taken in cyclical order, is connected at one end to one terminal of a D.C. source and at the other end to the said one terminal or to the other terminal of the source through predetermined ones of a plurality of paths, the first of which includes a normally-open pair of contacts of the said first relay and is connected to the said other terminal, the second of which includes the normally-closed branch of a second set of changeover contacts of the second relay and the normally-closed branch of a second set of changeover contacts on the third relay and is connected to the said other terminal, the third of which includes the normally closed branch of the second set of changeover contacts of the second relay and the normally-open branch of the second set of changeover contacts of the third relay and is connected to the said other terminal through a normally-open pair of contacts of a first switch and to the said one terminal through a normally-open pair of contacts of a second switch, the fourth of which includes the normally-open branch of the second set of changeover contacts of the second relay and the normally-closed branch of a third set of changeover contacts of the third relay and is connected to the said other terminal through a second normally-open pair of contacts of the second switch and to the said one terminal through a second normally-open pair of contacts of the said first switch, and the fifth of which includes the normally-open branch of the second set of changeover contacts of the second relay and the normally-open branch of the third set of changeover contacts of the third relay and is connected to the said one terminal of the D.C. source.

In another embodiment of the invention, the winding of each electromagnet relay, hereinafter referred to as the first relay, the relays being taken in cyclical order, is connected in a control circuit including a transistor or electron discharge valve device to control the flow of current through said winding, said transistor or valve device having a control electrode and two other electrodes and said control circuit further including means for biasing one of the said two other electrodes positively or negatively with respect to a datum potential lying between said two energising potentials in response to the said one or the said other of the two energising potentials from the first switching unit, means for applying the energising potentials from the second and third switching units to the ends respectively of a first potentiometer provided with a tap, means connecting the tap to the control electrode of the device, means for applying the energising potentials of the first and second switching units to the ends respectively of a second potentiometer provided with a tap, means including a resistor connecting said tap to the control electrode of the device, the last-mentioned tap or a point in the last-mentioned resistor being clamped to said datum potential and being adapted to be freed by the operation of a first switch, means for applying the energising potentials of the third and first switching units to the ends respectively of a third potentiometer provided with a tap, means including a resistor connecting the last-mentioned tap to the said control electrode, the last-mentioned tap or a point in the last mentioned resistor being clamped to said datum potential and being adapted to be freed by the operation of a second switch.

Preferably, the first and second switches are electromagnetic switches adapted to be operated by the first and second control voltages respectively.

Some embodiments of the invention will now be described, by way of example, with reference to the drawings accompanying this specification, in which.

Figure 1:
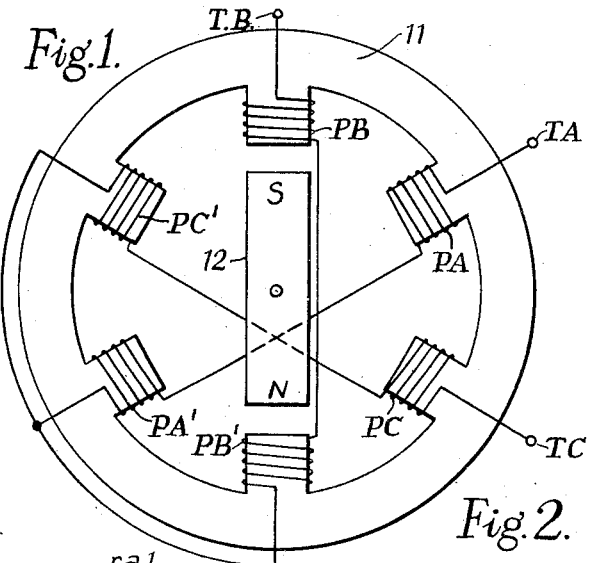
FIGURE 1 is a schematic diagram of a step-by-step motor for use in an electromechanical control system according to the invention.

Referring first to FIGURE 1, there is provided an electric step-by-step motor having a stator 11 and a rotor 12 rotatable within the stator. The stator has three pairs of pole pieces, PA, PA', PB, PB' and PC, PC'. Each pole piece carries a winding wound on to the pole pieces in the senses shown. The windings on each pair of pole pieces are connected together in series. The ends of the windings of the pole pieces PA, PB and PC are connected to supply terminals TA, TB and TC and the ends of the windings of the pole pieces PA', PB' and PC' are connected together. The rotor 12 is a two-pole permanent magnet rotatable about the axis of the stator.

Figure 2:
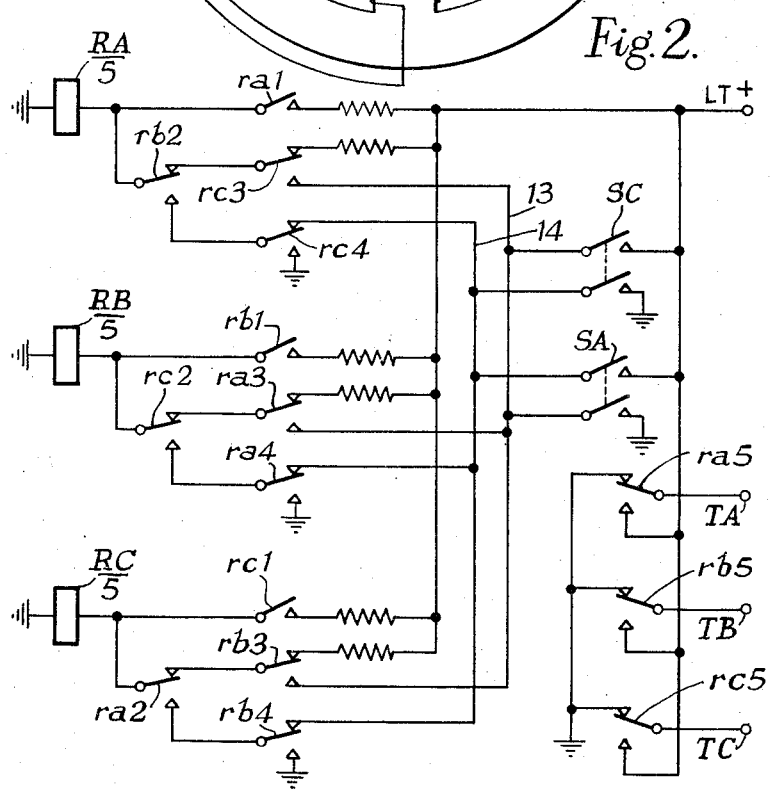
FIGURE 2 is a circuit diagram of means for operating the motor shown in FIGURE 1 from a source of direct current, using electromagnetic relays.

A circuit arrangement for operating the motor shown in FIGURE 1 is shown in FIGURE 2. The arrangement is such as to apply patterns of positive and negative potentials to the terminals TA, TB and TC in the following sequence or in the opposite sequence:

| TA | TB | TC |
|----|----|----|
| +  | +  | −  |
| −  | +  | +  |
| −  | −  | +  |
| +  | −  | +  |
| +  | −  | −  |

It will be seen that the application of a positive potential to the terminals TA and TB and a negative potential to the terminal TC causes the pole pieces PA, PC and PB' to become north poles and the pole pieces PB, PC' and PA' to become south poles. As a result, the south pole of the rotor 12 is repelled by the pole pieces PB and PC' and attracted by the pole piece PA. At the same time, the north pole of the rotor 12 is repelled by the pole pieces PB' and PC and attracted by the pole piece PA'. The rotor 12 thus moves clockwise one step to a position in which it is adjacent the pole pieces PA and PA'.

The next pattern of potentials to be applied to the terminals TA, TB and TC is − + −, that is to say, the potential of the terminal TA is then made negative. This makes the pole pieces PA and PA' south and north poles respectively and the rotor 12 is repelled by these pole pieces and the pole pieces PB and PB' and is attracted by the pole pieces PC and PC'. Thus, the rotor 12 moves clockwise through a further step.

By changing the pattern of potentials applied to the terminals TA, TB and TC in the sequences indicated above the rotor 12 may be made to step clockwise continuously.

If the rotor 12 is to be stepped anti-clockwise from the position shown in the drawing, the following patterns of potentials are applied to the terminals sequentially:

| TA | TB | TC |
|----|----|----|
| −  | +  | +  |
| +  | +  | −  |
| +  | −  | −  |
| +  | −  | +  |

When the first pattern of potentials is applied, the pole pieces PA and PB become south poles and the pole piece PC' a north pole. The south pole of the rotor 12 is repelled by the pole pieces PA and PB and attracted to the pole piece PC'. Similarly, the north pole of the rotor 12 is repelled by the pole pieces PB' and PA' and attracted by the pole piece PC. The rotor 12 is thus stepped anticlockwise to a position in which it is adjacent the pole pieces PC and PC'. Further steps of the rotor 12 are made by applying the patterns of potentials sequentially as indicated.

A circuit arrangement for producing either of the recurring sequences of potential patterns as indicated above will now be described with reference to FIGURE 2. Three electromagnetic relays RA, RB, RC, each having five sets of contacts, are employed. The winding of the relay RA is connected at one end to earth and at the other end through normally open contacts ra1 and a resistor to the positive terminal LT+ of a battery (not shown). The winding of the relay RA is further connected to the movable contact of a changeover set of contacts rb2, the two fixed contacts of which are connected to the movable contacts respectively of two further sets of changeover contacts rc3 and rc4. The upper fixed contact of the contact set rc3 is connected through a resistor to the terminal LT+ and the lower fixed contact thereof is connected to a common line connection 13. The upper fixed contact of the contact set rc4 is connected to a common line connection 14 and the lower fixed contact thereof is connected to earth.

The windings of the relays RB and RC are connected in like manner to the terminal LT+ and to common line connections 13 and 14.

In addition, there is provided a double switch SC, for use when the first-mentioned sequence is to be followed. The movable contacts of this switch are connected to the line connections 13 and 14 respectively and the associated fixed contacts are connected to the terminal LT+ and earth respectively. There is also provided a further double switch SA for use when the other sequence of potential patterns is to be followed, the movable contacts of this switch being connected to the line connections 14 and 13 respectively and the associated fixed contacts connected to the terminal LT+ and earth respectively.

The terminals TA, TB and TC shown in FIGURE 1 also appear in FIGURE 2 and are connected to the movable contacts respectively of changeover sets of contacts ra5, rb5 and rc5.

In operation, when the battery (not shown) is connected to the terminal LT+, all three relays RA, RB and RC become energised, the relay RA being energised by current flowing through contacts rb2 and rc3 and the relay winding to earth, the relay RB being energised by current flowing through contacts rc2 and ra3 and the relay winding to earth, and the relay RC being energised by current flowing through the contacts ra2 and rb3 and the relay winding to earth. One of the relays, for example, the relay RC is, however, last to operate and the operation of contacts ra2 and rb4 short circuit the winding of this relay to earth. The contacts of the relay RC therefore remain in the positions shown in the drawing. The contacts of the other two relays switch over and relays RA and RB are held energised by currents flowing through contacts ra1 and rb1. In this condition a positive potential is applied through contacts ra5 and rb5 to the terminals TA and TB and the terminal TC is connected to earth.

For clockwise stepping of the motor, the switch SC is closed. This short circuits the winding of relay RA to earth through contacts rb2, rc4 and the lower contacts of the switch SC. Relay RA releases and the pattern of potentials at the terminals TA, TB and TC changes from + + − to − + −. As soon as relay RA releases contacts ra2 switch back to the position shown and connect the winding of the relay RC to the terminal LT+ through the contacts ra2, rb3 (switched over) and the upper contacts of the switch SC. The pattern of potentials changes from − + − to − + + at the terminals TA, TB and TC. As soon as relay RC operates contacts rc2 switch over and the winding of relay RB is short circuited to earth through contacts rc2 (switched over), ra4 and the lower contacts of the switch SC. The pattern of potentials at the terminals TA, TB and TC changes to − − +.

For anti-clockwise stepping of the motor, the switch SA is closed and the switch SC opened. Let us assume that initially the winding of the relay RA is short-circuited and the windings of the relays RB and RC are held energised.

Upon closing the switch SA, the winding of the relay RC is short-circuited to earth through the contacts ra2, rb3 (switched over) and the lower contacts of the switch SA. The pattern of potentials changes from − + + to − + − at the terminals TA, TB and TC. The release of relay RC causes contacts rc4 to return to the position shown and current flows to the winding of relay RA through contacts rb2, rc4 and the upper contacts of switch SA. Relay RA becomes energised and the pattern of potentials at the terminal TA, TB and TC change from − + − to + + −. The motor steps anti-clockwise in response to each change in the pattern of potentials and continues to do so, so long as the switch SA remains closed.

A disadvantage of the circuit arrangement shown in FIGURE 2 is that the maximum speed of the motor is limited by the time it takes the relays to operate and release.

A second embodiment of the invention employing transistors and high speed relays will now be described with reference to FIGURE 3. The circuit shown above the broken line in FIGURE 3 is one of three identical units, the circuits below this line being common to all three units. The terminals TA, TB and TC are the same as those shown in FIGURE 1. The potential applied to the terminal TA is determined by the position of the contacts ra1 of a high speed relay RA. In one position of the contacts ra1, the terminal TA is maintained at a potential of −12 volts with respect to earth and in the other position of the contacts ra1 the terminal TA is maintained at a potential of +12 volts with respect to earth.

The winding of the relay RA is connected between the collector electrode of a transistor 15 and the negative terminal of a source of direct current, maintained at a potential of −24 volts with respect to earth. The emitter electrode is connected to earth through a resistor 16 and to the terminal TA through a resistor 17. When the relay is in an unoperated condition, the terminal TA is at a potential of −12 volts and the transistor 15 is cut off.

The plate of the transistor 15 is connected to the terminals TB and TC through two resistors 18 and 19 respectively. The transistor plate is also connected through a resistor 20 to the terminal TA via a resistor 21 and to the terminal TB via a resistor 22. The transistor plate is further connected through a resistor 23 to the terminal TA via a resistor 24 and to the terminal TC via a resistor 25.

The end of the resistor 20 remote from the plate of the transistor 15 is connected to terminals $TP_1$ and $TP_2$ through oppositely poled diodes D1 and D2 and the end of the resistor 23 remote from the plate of the transistor 15 is connected to terminals $TQ_1$ and $TQ_2$ through oppositely poled diodes D3 and D4.

Two further circuits (not shown) identical to the circuit so far described are also provided, the terminals TA, TB and TC being replaced by terminals TB, TC and TA for the second circuit and by TC, TA and TB in the third circuit.

The terminals $TP_1$ and $TP_2$ of each circuit are connected to earth through oppositely poled diodes D5 and D6 and to +12 and −12 volt supply terminals respectively via resistors 26 and 27. The terminals $TQ_1$ and $TQ_2$ of each circuit are connected to earth through oppositely poled diodes D7 and D8 and to +12 volt and −12 volt supply terminals respectively via resistors 28 and 29. A switch p1 is connected between terminals $TP_1$ and $TP_2$ and a switch q1 is connected between the terminals $TQ_1$ and $TQ_2$.

In operation, as soon as the voltage supply is connected in circuit, relay RA together with corresponding relays RB and RC (not shown) become energised. Assuming that relay RA is last to operate, terminals TB and TC become positive and a positive potential is applied to the plate of the transistor 15. The transistor 15 becomes cut off and relay RA becomes de-energised and the terminal TA is held negative through contacts ra1.

As shown, the terminals $TP_1$ and $TP_2$ are short-circuited by the switch p1 and the terminals $TQ_1$ and $TQ_2$ by the switch q1. In these positions, the ends of the resistors 20 and 23, remote from the plate of the transistor 15, are clamped to earth by the diodes D1, D2, D5 and D6 and by diodes D3, D4, D7 and D8, acting in well known manner as 4-diode clamps. However, when the switch p1 is opened the diodes connected to the terminals $TP_1$ and $TP_2$ are back biased through resistors 26 and 27 and the end of the resistor 20 is free to undergo voltage excursions.

The sequence of changing potential patterns at the terminals TA, TB and TC, for producing clockwise rotation of the motor shown in FIGURE 1 is obtained by opening the switch p1. To facilitate the description of the operation of the circuit it will be assumed that initially the potentials at the terminals TA, TB and TC are +12, +12 and −12 volts respectively. As soon as the switch p1 is opened, the positive potential applied to the terminals TA and TB is applied to the plate of the transistor 15, causing the latter to become cut off. Relay RA becomes de-energized and contacts ra1 switch back to the position shown and connect the terminal TA to the −12 volt supply terminal. The pattern of potentials at the terminals TA, TB and TC thus changes from + + − to − + −. The potentials at the terminals TA and TC were, however, equal and opposite and the end of the resistor 23 remote from the transistor 15 remained at earth potential.

The next change in the pattern of potentials at the terminals TA, TB and TC is from − + − to − + +, that is to say, the terminal TC becomes positive. This change is effected by the operation of the third circuit (not shown) which includes the relay RC. The pair of terminals TA and TB to the left of FIGURE 3 are substituted by terminals TC and TA in the third circuit (not shown) and as terminals TC and TA are both negative they apply a negative potential to the plate of the transistor 15 causing the current to flow through the latter and energise the relay RC (not shown). The operation of the circuits continue in a cyclical manner, the pattern of potentials changing in the desired sequence for clockwise operation of the motor shown in FIGURE 1.

For a sequence of potential patterns for operating the motor in an anti-clockwise direction the switch q1 is opened and switch p1 is closed.

Each of the three high-speed relays may if desired be replaced by a further transistor connected as a bistable circuit with the transistor shown. A suitable arrangement is described in "Mullard Technical Communications," vol. 2, No. 19, July 1956, pp. 254 to 277.

Figure 3:
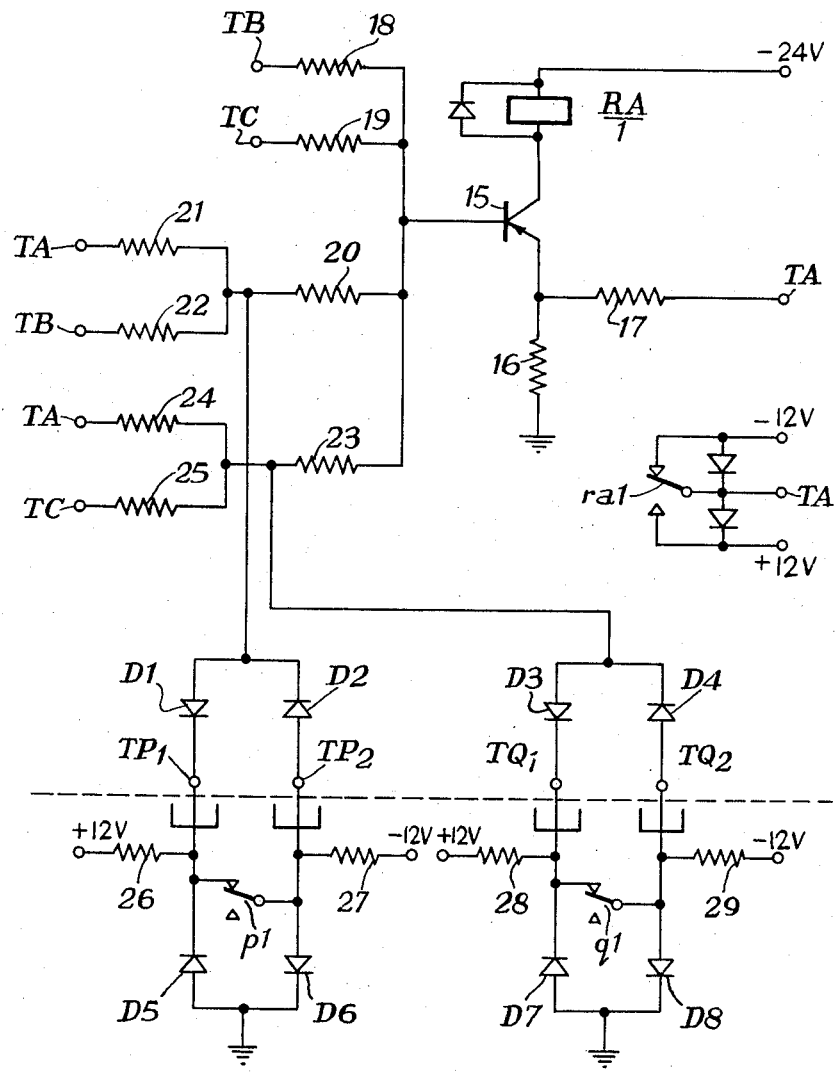
FIGURE 3 is a circuit diagram of one of three identical circuits which can be employed together to operate the motor shown in FIGURE 1 from a source of direct current, using transistors and high speed relay devices.
Figure 4:
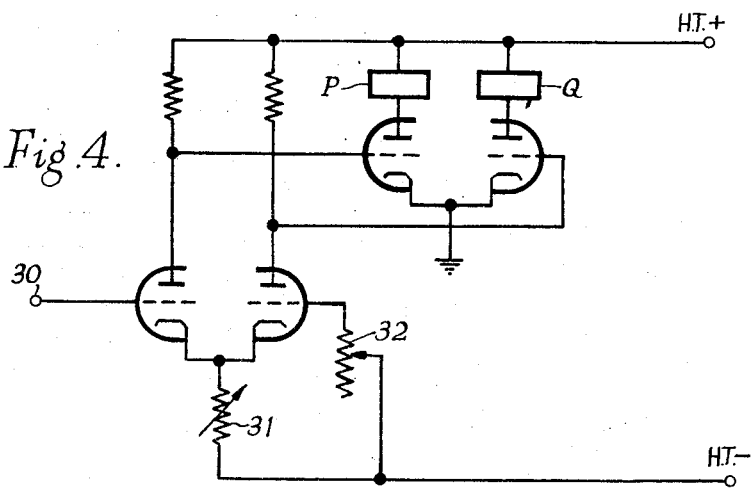
FIGURE 4 is a circuit diagram of a differential amplifier for use in controlling the circuit shown in FIGURE 3.

Circuit arrangements for operating the switches p1 and q1 shown in FIG. 3, is shown in FIG. 4. The circuit shown in FIG. 4 is a two-stage differential amplifier and an input signal, constituting an error signal in a servo-system for example, is applied to input terminal 30. Relays P and Q for operating contacts p1 and q1 shown in FIG. 3 are connected in the anode circuits respectively of the double triode output valve of the amplifier. A variable resistor 31 is provided by means of which the "dead space" in which neither relay is operative can be reduced to a fraction of a volt. The input comparison level can be set by adjustment of a potentiometer 32.

It will be appreciated that it is uneconomical to provide an amplifier having much more power than that required for full speed operation of the motor. However, where the system is one involving time integration a momentary overload of the amplifier results in a loss in the integral and precautions must be taken to avoid this.

According to yet another embodiment of the invention, there is provided an electromechanical control system according to the present invention and comprising a signal input circuit for generating the first and second control voltages in response to the application of an input signal thereto, the signal input circuit comprising an integrating circuit adapted to generate an output signal representative of the integral of signals applied thereto, an output stage including means for generating the said first and second control voltages, means for applying the output signal from the integrating circuit to the output stage to cause the generating of either of said control volages, feedback means adapted to apply to the integrating circuit feedback signals at a rate proportional to the speed of rotation of the motor, said signals being applied in such a sense as to reduce the magnitude of the output signal of the integrating circuit.

Figure 5:
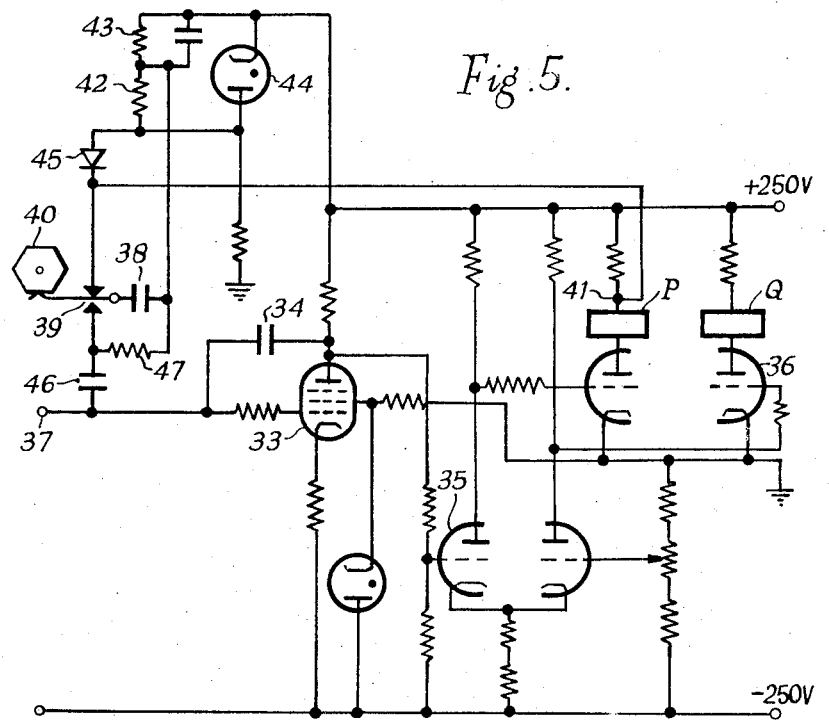
FIGURE 5 is a circuit diagram of a signal input circuit for an electromechanical control system according to the present invention.

FIGURE 5 is a circuit diagram of an input circuit according to the further embodiment of the invention. The circuit comprises a pentode valve 33 with an integrating capacitor 34 connected to form a Miller integrator circuit. The anode of the valve 33 is connected to the control electrode of the left-hand triode section of a double triode valve 35 connected for push-pull operation. The anodes of the double triode valve 35 are connected to the control electrodes respectively of a further double triode valve 36, the anode circuits of which include the windings respectively of relay P and Q.

Control signals are applied to an input terminal 37, and are fed to the control electrode of the valve 33 together with feedback pulses derived from a capacitor 38, which is alternatively charged and discharged by the switching back and forth of a set of changeover contacts 39 by a hexagonal cam 40 mounted on the output shaft of the motor shown in FIGURE 1. The position of the cam 40 as shown in the figure corresponds to one of the rest positions of the rotor shown in FIGURE 1. In this position, the movable contact of the contact set 39 engages the upper fixed contact of the contact set and is thereby connected to a point 41 in the anode circuit of the left-hand triode section of the valve 36. The plate of the capacitor 38, remote from the contact set 39, is connected to a point 42 in a potential divider 43 stabilised by an 85 volt voltage stabiliser 44. The potential of the point 42 is 42.5 volts below the H.T. supply voltage of +250 volts. The potential of the point 41 on the other hand is at +250 volts when the left-hand triode section of the valve 36 is cut off and relay P released, and is held at 85 volts below this value by a diode 45 when the triode section is conducting and the relay P is operated. Thus, the capacitor 38 is charged to ±42.5 volts depending on which of the relays P and Q is energised, and hence in which direction the motor operated thereby is rotating at any instant.

The capacitance of the capacitor 38 is of the order of 1/50th of that of the integrating capacitor 34.

In operation, positive-going input signals are applied to the input terminal 37 and are integrated by capacitor 34. The fall in anode potential of the valve 33 causes the anode of the left-hand section of valve 35 to rise and the left-hand section of the valve 36 to conduct. Relay P becomes energised and the circuit described with reference to FIGURE 3 operates to cause the motor shown in FIGURE 1 to rotate clockwise. The potential of the point 41 falls to a value 85 volts below that of the positive voltage supply terminal and clockwise rotation of the cam 40 causes the capacitor 38 to be repeatedly charged to a potential of 42.5 volts and discharged as negative-going pulses into the control electrode circuit of the valve 33. Thus, immediately the motor responds, the amplitude of the input signal applied to the terminal 37 is reduced. Input signals which would otherwise overload the valve 33 are thus reduced in amplitude in this system. When a pulse which would normally overload the valve 33 is applied to the input terminal 37 the motor responds and reaches maximum speed. The feedback signals in the form of pulses from the capacitor 38 are, however, not adequate to cancel the charge on the capacitor 34. The motor nevertheless continues to rotate tending to reduce this increase in charge until the input signal peak is reached and continues to rotate until the anode of the valve 33 returns to its mean value and the relay P is de-energised. The rotation of the motor thus accurately represents the integral of the input signal applied to the input terminal 37.

I claim:

1. An electromechanical control system comprising a step-by-step motor including a stator member and a rotor member relatively rotatable about an axis, one said member including a circular array of at least six magnetizable pole-pieces each having an associated winding, adjacent pole-pieces being equally spaced, diametrically opposite pole-pieces with their associated windings constituting a pair, such that energization of a pair of opposite windings magnetizes the respective pole-pieces to assume opposed polarities, the other of said members comprising a pair of diametrically opposite magnetic pole-pieces of opposed polarities for relative alignment with successive pole-pieces of the one member, and an electrical circuit for sequentially applying six different predetermined patterns of positive and negative potentials in either one of two opposite sequences to the pairs of energizing windings to cause step-by-step rotation thereof in one of two opposite directions respectively, said circuit including switch means having six different combinations of conditions to which it can be switched to apply to said energizing windings the six energizing potential patterns respectively, and switch control means responsive to the application of a first control voltage to enable said switch means continuously and cyclically through the six combinations in one direction and responsive to a second control voltage to enable said switch means continuously and cyclically through the six combinations in the opposite direction, and means responsive to the absence of both said control voltages to cause said circuit to be stable, said switch means comprising three switch units associated respectively with the windings of the three pairs of the pole pieces of the said one member of the motor, each switch unit having two stable states, in one of which it applies said one of the two energizing potentials to the energizing windings of its associated pair of pole pieces and in the other of which it applies the other of the two energizing potentials to the energizing windings of said associated pair of pole pieces, the switch control means comprising control apparatus for cyclically switching the three switching units, the control apparatus being responsive to a first control voltage and to the stable states of any two of the three switch units to cause the preceding one of the two units to switch to its other stable state, said control apparatus being responsive to a second control voltage and to the stable states of any two of the three switch units to cause the succeeding one of the two units to switch to its other stable state, in the absence of said voltages the switch units not changing their stable states to which they are switched.

2. A system according to claim 1, wherein the first and second switch units are electromagnetic switches.

3. An electromechanical control system comprising a step-by-step motor including a stator member and a rotor member relatively rotatable about an axis, one said member including a circular array of at least six magnetizable pole-pieces each having an associated winding, adjacent pole-pieces being equally spaced, diametrically opposite pole-pieces with their associated windings constituting a pair, such that energization of a pair of opposite windings magnetizes the respective pole-pieces to assume opposed polarities, the other of said members comprising a pair of diametrically opposite magnetic pole-pieces of opposed polarities for relative alignment with successive pole-pieces of the one member, and an electrical circuit for sequentially applying six different predetermined patterns of positive and negative potentials in either one of two opposite sequences to the pairs of energizing windings to cause step-by-step rotation thereof in one of two opposite directions, respectively, said circuit including switch means having six different combinations of conditions to which it can be switched to apply to said energizing windings the six energizing potential patterns respectively, and switch control means responsive to the application of a first control voltage to enable said switch means continuously and cyclically through the six combinations in one direction and responsive to a second control voltage to enable said switch means continuously and cyclically through the six combinations in the opposite direction, means responsive to the absence of both said control voltages to cause said circuit to be stable, a signal input circuit for generating the first and second control voltages in response to the application of an input signal thereto, the signal input circuit comprising an integrating circuit adapted to generate an output signal representative of the integral of signals applied thereto, an output stage including means for generating the said first and second control voltages, means for applying the output signal from the integrating circuit to the output stage to cause the generation of either of said control voltages, feedback means adapted to apply to the integrating circuit feedback signals at a rate proportional to the speed of rotation of the motor, said signals being applied in such a sense as to reduce the magnitude of the output signal of the integrating circuit.

4. A system according to claim 3, wherein said feedback means comprises a charge storage element and a two-position switch coupled to said motor and enabled at a rate proportional to the speed of the motor whereby responsive to one position of said switch said charge storage element is charged in one of two opposite directions responsive to a first control voltage from said output stage and in a second direction responsive to a second control voltage from said output stage, and responsive to the other position of said switch said storage element discharges a signal to said integrating circuit.

5. An electromechanical control system comprising a step-by-step electric motor and an electrical circuit for effecting step-by-step rotation of the motor in either one of two opposite directions, the motor having a stator member and a rotor member, three pairs of opposite pole pieces equally spaced around one of said members, and energizing windings on the pole pieces arranged to effect magnetization with opposite polarities of the pole pieces of each of the three pairs, the other of said members having two further pole pieces of opposite polarities arranged for co-operation with each of said pairs of pole pieces to effect relative rotation of the two members, the electrical circuit including three switching units each associated with one of the pairs of opposite pole pieces, a direct-current voltage supply connected to the energizing windings through the three switching units, an interconnection network coupled between the switching units, and switch means connected to apply one of two predetermined control potentials to the said network, the network including three relays for switching one of the switching units between two conditions to cause energization in either one of two directions of the windings of the associated pair of pole pieces from the direct-current voltage supply, and circuit means coupling the three relays responsive to one of said predetermined control potentials to effect cyclical switching in a predetermined sequence through the six possible combinations of conditions of the three switching units and responsive to the other of said control potentials to effect cyclical switching through the said sequence in the opposite direction, said switch means includes first and second switches, and each switching unit includes first, second and third sets of changeover contacts of the first, second and third corresponding relays, a direct current source having two terminals and means enabling the relays in cyclical order to sequentially connect their associated windings to the two terminals of the direct current source through a predetermined plurality of paths, comprising in turn for each relay a first path including a normally-open pair of contacts of the said first relay and connected to the said other direct terminal, a second path including the normally-closed branch of a second set of changeover contacts of the second relay and the normally-closed branch of a second set of changeover contacts of the third relay and connected to the said other direct current terminal, the third path including the normally-closed branch of the second set of changeover contacts of the second relay and the normally-open branch of the second set of changeover contacts of the third relay and connected to the said other direct current terminal through a normally-open pair of contacts a first switch of said switch means and to the said one direct current terminal through a normally-open pair of contacts of a second switch of said switch means, a fourth path including the normally-open branch of the second set of changeover contacts of the second relay and the normally-closed branch of a third set of changeover contacts of the third relay and connected to the said other direct current terminal through a second normally-open pair of contacts of the second switch and to the said one direct current terminal through a second normally-open pair of contacts of the said first switch, and a fifth path including the normally-open branch of the second set of changeover contacts of the second relay and the normally-open branch of the third set of change-over contacts of the third relay and connected to the said one terminal of the direct current source.

6. An electromechanical control system comprising a step-by-step electric motor and an electrical circuit for effecting step-by-step rotation of the motor in either one of two opposite directions, the motor having a stator member and a rotor member, three pairs of opposite pole pieces equally spaced around one of said members, and energizing windings on the pole pieces arranged to effect magnetization with opposite polarities of the pole pieces of each of the three pairs, the other of said members having two further poles pieces of opposite polarities arranged for cooperation with each of said pairs of pole pieces to effect relative rotation of the two members, the electrical circuit including three switching units each associated with one of the pairs of opposite pole pieces, a direct-current voltage supply connected to the energizing windings through the three switching units, an interconnection network coupled between the switching units, and switch means connected to apply one of two predetermined control potentials to the said network, the network including three relays for switching one of the switching units between two conditions to cause energization in either one of two directions of the windings of the associated pair of pole pieces from the direct-current voltage supply, and circuit means coupling the three relays responsive to one of said predetermined control potentials to effect cyclical switching in a predetermined sequence through the six possible combinations of conditions of the three switching units and responsive to the other of said control potentials to effect cyclical switching through the said sequence in the opposite direction, each switching unit including a first set of changeover contacts associated with said relays and responsive to condition of the switching unit to apply to the associated windings an energizing potential lying to one side of a datum potential and responsive to the other condition of the switching unit to an energizing potential lying to the other side of the datum potential, and means for connecting the windings in cyclical order in a control circuit, said control circuit including an electron discharge device having a control electrode and two other electrodes to control the flow of current respectively through said windings, said control circuit further including means responsive to said one of two energizing potentials from said 1st switching unit for biasing the one of the said two other electrodes positively and responsive to the other energizing potential from said switching unit for biasing said one electrode negatively, means for applying the energizing potentials from the second and third switching units to the ends respectively of a first potentiometer provided with a tap, first means including a resistor connecting the tap to the control electrode of the device, means for applying the energizing potentials of the first and second switching units to the ends respectively of a second potentiometer provided with a tap, second means including a resistor connecting said tap to the control electrode of the device, the tap of the second potentiometer being clamped at a point in the resistor of said second means to said datum potential and being adapted to be freed by the operation of a first switch, means for applying the energizing potentials of the third and first switching units to the ends respectively of a third potentiometer provided with a tap, third means including a resistor connecting the tap of said third potentiometer to the said control electrode, the last mentioned tap at a point in the resistor of said third means being clamped to said datum potential and being adapted to be freed by the operation of a second switch.

7. A system according to claim 6 in which the first and second switches are electromagnetic switches coupled to a differential amplifier for operation in accordance with the level of an input signal relative to a predetermined comparison voltage.

8. A system according to claim 7 including a signal-input circuit for generating control voltages for the first and second switches in response to the application of the input signal thereto, the signal input circuit comprising an integrating circuit adapted to generate an output signal representative of the integral of signals applied thereto, an output stage including means for generating the said first and second control voltages, means for applying the output signal from the integrating circuit to the output stage to cause the generating of either of said control voltages, feedback means adapted to apply to the integrating circuit feedback signals at a rate proportional to the speed of rotation of the motor, said signals being applied in such a sense as to reduce the magnitude of the output signal of the integrating circuit.

References Cited in the file of this patent
UNITED STATES PATENTS

| | | |
|---|---|---|
| 1,343,362 | Graham | June 15, 1920 |
| 2,624,017 | Putnocky | Dec. 30, 1952 |
| 2,706,270 | Steele | Apr. 12, 1955 |